(12) United States Patent
Kang et al.

(10) Patent No.: US 7,440,759 B2
(45) Date of Patent: Oct. 21, 2008

(54) SYSTEM AND METHOD FOR DYNAMIC CHANNEL ALLOCATION IN A COMMUNICATION SYSTEM USING AN ORTHOGONAL FREQUENCY DIVISION MULTIPLE ACCESS NETWORK

(75) Inventors: Hyun-Jeong Kang, Seoul (KR);
Chang-Hoi Koo, Seongnam-si (KR);
Jung-Je Son, Seongnam-si (KR);
Yeong-Moon Son, Anyang-si (KR);
So-Hyun Kim, Suswon-si (KR);
Sung-Jin Lee, Suswon-si (KR)

(73) Assignee: Samsung Electronics Co., Ltd (KR)

( * ) Notice: Subject to any disclaimer, the term of this patent is extended or adjusted under 35 U.S.C. 154(b) by 508 days.

(21) Appl. No.: 10/941,707

(22) Filed: Sep. 15, 2004

(65) Prior Publication Data
US 2005/0058097 A1     Mar. 17, 2005

(30) Foreign Application Priority Data
Sep. 17, 2003    (KR)    ...................... 10-2003-0064492

(51) Int. Cl.
*H04Q 7/20*    (2006.01)
(52) U.S. Cl. .................................................. 455/452.1
(58) Field of Classification Search .............. 455/452.1, 455/452.2; 370/338, 335, 310, 318, 320, 370/328, 342, 280, 337, 348
See application file for complete search history.

(56) References Cited

U.S. PATENT DOCUMENTS 5,422,932 A * 6/1995 Kay et al. ................. 455/452.1

\* cited by examiner

*Primary Examiner*—William D Cumming
(74) *Attorney, Agent, or Firm*—The Farrell Law Firm, PC

(57) ABSTRACT

A system and method for dynamically allocating channels in a wireless communication system including multiple sub-channels and multiple frame cells, each of the sub-channels being an assembly including a preset number of sub-frequency bands divided from an overall frequency band, the frame cells using each of the sub-channels as a basic transmission unit and having a frequency domain and a time domain occupied by the sub-channels. A mobile station transmits channel quality information of frame cells to an access point. An access router transmits channel allocation information about the multiple frame cells and sub-channels determined according to the received channel quality information to the access point, and the access point receives the channel allocation information about the multiple frame cells and sub-channels, compares the channel allocation information with newest channel quality information, and allocates a sub-channel of a frame cell selected according to the comparison to the mobile station.

7 Claims, 9 Drawing Sheets

SYSTEM AND METHOD FOR DYNAMIC CHANNEL ALLOCATION IN A COMMUNICATION SYSTEM USING AN ORTHOGONAL FREQUENCY DIVISION MULTIPLE ACCESS NETWORK

PRIORITY

This application claims priority to an application entitled "System and Method for Dynamic Channel Allocation in Communication System using Orthogonal Frequency Division Multiple Access Network" filed in the Korean Intellectual Property Office on Sep. 17, 2003 and assigned Serial No. 2003-64492, the contents of which are hereby incorporated by reference.

BACKGROUND OF THE INVENTION

1. Field of the Invention

The present invention relates generally to a wireless communication system using an orthogonal frequency division multiplexing scheme, and more particularly to a system and a method for dynamically allocating a channel according to channel states.

2. Description of the Related Art

Currently, a $3^{rd}$ generation (3G) mobile communication system is advancing to a $4^{th}$ generation (4G) mobile telecommunication system. In the $4^{th}$ generation (4G) communication system, which is a next generation communication system, a large amount of research is actively being carried out in order to provide users with various qualities of service (QoS) and a data transmission rate of about 100 Mbps.

A wireless local area network (LAN) system and a wireless metropolitan area network (MAN) system generally support a data transmission rate of 20 to 50 Mbps. Therefore, more specifically, a large amount of research is being conducted in the 4G communication system for developing a communication system providing a superior QoS and mobility through the wireless LAN system and the wireless MAN, in order to provide relatively high data transmission rate.

Because the wireless MAN system has a wide coverage area and supports a high data transmission rate, the wireless MAN communication system is suitable for a high-speed communication service. However, because the wireless MAN communication system does not consider mobility of a user, that is, a subscriber station (SS), a handover, which is required when the SS is moved, is not considered in the wireless MAN communication system.

An IEEE (Institute of Electrical and Electronics Engineers) 802.16a communication system communicates by performing a ranging operation between an SS and a base station (BS).

FIG. 1 is a block diagram schematically illustrating a conventional broadband wireless access communication system utilizing an orthogonal frequency division multiplexing (OFDM) scheme and an orthogonal frequency division multiple access (OFDMA) scheme. More specifically, FIG. 1 is a schematic view illustrating a structure of the IEEE 802.16a communication system.

However, prior to describing FIG. 1, the wireless MAN system is a broadband wireless access (BWA) communication system and has a wider coverage area and a higher data transmission rate as compared with those of a wireless LAN system. The IEEE 802.16a communication system is a system utilizing the OFDM scheme and the OFDMA scheme in order to provide a broadband transmission network for a physical channel of the wireless MAN communication system. That is, the IEEE 802.16a communication system is the broadband wireless access communication system utilizing the OFDM/OFDMA schemes. Because the IEEE 802.16a communication system uses the OFDM/OFDMA schemes in the wireless MAN system, physical channel signals can be transmitted through a plurality of sub-carriers, and a high-speed data transmission is possible.

An IEEE 802.16e communication system is a system reflecting mobility of the SS in addition to the IEEE 802.16a communication system. That is, both the IEEE 802.16a communication system and the IEEE 802.16e communication system are broadband wireless access communication systems utilizing the OFDM/OFDMA schemes, but the IEEE 802.16e communication system considers the mobility of a SS. Hereinafter, for the purpose of description, the IEEE 802.16a communication system will be described by way of example.

Referring to FIG. 1, the IEEE 802.16a communication system has a single cell structure and includes a base station (BS) 100 and a plurality of subscriber stations (SSs) 110 to 130, which are managed by the BS 100. The BS 100 transmits/receives signals to/from the SSs 110 to 130 using the OFDM/OFDMA schemes.

4G mobile telecommunication systems have been standardized in an attempt to provide a convergence of services and an efficient combination of a wired communication network and a wireless communication network, beyond simple wireless communication services provided by prior generation mobile telecommunication systems. Accordingly, there has been a request for a technique enabling the wireless communication network to transmit data having a large capacity, which is nearly equivalent to the capacity of data that can be transmitted by the wired communication network.

Therefore, in the 4G mobile telecommunication systems, the OFDM scheme has been actively studied as a useful scheme for transmitting data at a high speed through wired/wireless channels. The OFDM scheme uses a scheme for transferring data using multi-carriers. That is, the OFDM scheme is a kind of a Multi-Carrier Modulation (MCM) scheme for converting serially input symbols into parallel symbols, modulating the parallel symbols into multiple sub-carriers having mutual orthogonality, that is, multiple sub-carrier channels, and transmitting the multiple sub-carrier channels.

The OFDM scheme is similar to a conventional frequency division multiplexing (FDM) scheme. However, the OFDM scheme has a characteristic that multiple sub-carriers are transmitted while maintaining orthogonality to each other. As a result, the OFDM scheme is capable of obtaining the best transmission efficiency when data is transmitted at a high speed. Also, the OFDM scheme has superior frequency usage efficiency and a characteristic resistant to multi-path fading. Additionally, the OFDM scheme efficiently utilizes frequency by utilizing frequency spectrums that overlap each other. Further, the OFDM scheme is a highly resistant to frequency selective fading, multi-path padding, and impulse noises, can reduce Inter Symbol Interference (ISI) between symbols by utilizing guard intervals, and enables an equalizer to have a simple hardware structure.

Multiple mobile stations and a base station positioned within one cell have to share resources with each other in order to increase channel utilization in the OFDM system. One of the sharable resources in the OFDM system is a sub-carrier, which is channelized by the base station. Optimum channel utilization can be secured according to a method in which the base station allocates the sub-carriers to the mobile stations within the cell.

Methods for allocating the sub-carriers include a static allocation method and a dynamic allocation method. The static allocation method includes a Static Sub-carrier Assignment (SSA) scheme, a Pseudo Static Assignment scheme (PSA), and a Simple Rotating Sub-carrier Space Assignment (Simple RSSA) scheme. The dynamic allocation method includes a Fast Dynamic Channel Allocation (Fast DCA) scheme.

The SSA scheme is the simplest scheduling method in which a predetermined number of sub-carriers are statically assigned to mobile stations. Particularly, in the SSA scheme, all the selected sub-carriers are assigned to mobile stations regardless of channel states. Although the SSA scheme ensures equality when channels are allocated to mobile stations, the SSA scheme cannot ensure quality of sub-carriers allocated to mobile stations.

In the PSA scheme, sub-carriers statically allocated to mobile stations can be reassigned by changing the sub-carriers between the mobile stations. More specifically, the PSA scheme changes sub-carriers, which can prevent channel quality of mobile stations from being degraded and assigns sub-carriers in a good condition to mobile stations within a range of allocable sub-carriers, thereby raising transmission efficiency.

The Simple RSSA scheme allocates sub-carriers on the basis of priorities. For example, the priorities can be arranged according to a quality of service (QoS). More specifically, through the simple RSSA scheme, although the same number of sub-carriers are allocated to mobile stations, a sub-carrier with good condition is allocated to a mobile station with a highest priority first, and then, sub-carriers with relatively low quality are allocated as priority is lowered. The simple RSSA scheme can provide good QoS. However, the RSSA scheme causes differentiated allocation between mobile stations when sub-carries are allocated the mobile stations.

The Fast DCA scheme form among the dynamic assignment methods minimizes intra-cell interference and inter-cell interference and allocates the optimal channel to a mobile station on the basis of a channel condition.

FIG. 2 illustrates a time relation during a dynamic channel allocation, depending on a decision of an access point in a conventional OFDM mobile telecommunication system. Referring to FIG. 2, a mobile station 200 periodically transfers channel quality information (CQI) to an access point 220 to which the mobile station 200 belongs in step 202. For example, the CQI may include a signal-to-noise ratio (SNR). The access point 220 selects a sub-channel to be allocated to the mobile station 200 by means of the CQI carried according to frame cells. The sub-channel is selected by selecting optimal frame cells, then, by selecting idle sub-channels from among sub-channels corresponding to the optimal frame cells. The access point 220, which has selected the sub-channel, allocates the sub-channel of the selected frame cells to the mobile station 200 such that the mobile station 200 can utilize the sub-channel in step 222. The mobile station 200, which has received information about the sub-channel allocation, transmits signals through the allocated sub-channel.

As illustrated in FIG. 2, the access point 220 performs an overall process of analyzing CQI according to frame cells transmitted from the mobile station 200, selecting an optimal channel to be utilized by the mobile station 200, and allocating the optimal channel to the mobile station 200. As described above, because the access point 220 performs the overall process, it is possible to reduce back-haul delay time consumed in a network end.

However, when the mobile station 200 performs a handover, the access point 220 must transfer information thereof and CQI of the mobile station 200 to an access router 240 in order to progress a handover process in step 224. The access router 240 enables the mobile station 200 to perform the handover using CQI transmitted from the access point 220 in step 244, and transfer handover process information to the access point 220 in step 226. The access point 220 performs the handover according to the handover process information received from the access router 240 in step 230.

As described above, when the handover of the mobile station 200 occurs, the access point 220 must receive the handover process information for the mobile station 200 from the access router 240, and then, transfer the handover process information to the mobile station 200. Accordingly, a delay occurs, which is as long as total process time for handover illustrated by reference numeral 206 of FIG. 2, and it is impossible to rapidly support the handover of the mobile station because of the delay. In addition, when packets are transmitted from the access point 220 to the access router 240 in order to perform the handover, the packets may be repeatedly transmitted or may be lost. Therefore, the packets must be transmitted with sequence numbers in order to prevent the packets from being lost.

FIG. 3 illustrates a process of dynamically allocating channels depending on a decision of an access router in a conventional OFDM mobile telecommunication system according to a passage of time. Referring to FIG. 3, a mobile station 300 periodically transmits CQI to an access point 320 to which the mobile station 300 belongs according to frame cells in step 302. The access router 340 receives the CQI from the access point 320 in step 322, and arranges frame cells in order of superior quality based on the CQI during an access router process time. In selection of sub-channels of the frame cells by the access router 340, a frame cell having a higher quality is assigned prior to other frame cells or frame cells having a quality higher than a predetermined standard are first assigned from among the frame cells having superior CQI.

As described above, information about frame cells selected is transmitted to the access point 320. More specifically, the mobile station 300 transmits CQI for ten frame cells to the access point 320. The access router 340 receives the CQI from the access point 320 and selects five frame cells from among the ten frame cells in order of superior quality. It is assumed that the selected five frame cells have sequence numbers of '4', '2', '7', '9', and '1', respectively, and each frame cell has three sub-channels of 'A', 'B', and 'C'. It is noted that the number of the sub-channels is a changeable variable when each frame is designed.

The access router 340 searches sub-channels of 'A', 'B', and 'C' of the fourth frame cell with the best quality from among the selected five frame cells, and selects an idle sub-channel from among the three sub-channels. If all sub-channels of the fourth frame cell are allocated to other mobile stations, the access router 340 searches sub-channels of 'A', 'B', and 'C' of the second frame with the next superior quality. The above search process is repeated up to a first frame until a sub-channel is selected. If there is no sub-channel selected even though the search process is performed up to the first frame, the search process is carried out with respect to sub-channels of remaining five frame cells excluding the above five frame cells. The access point 320, which has received information about a sub-channel of a frame cell selected through the search process, allocates the sub-channel to the mobile station 300. The access router 340 updates information about sub-channels and frame cells thereof on the basis of the information on a frame cell and a sub-channel transferred to the access point 320 in order to consider the information when selecting a sub-channel of a frame cell to be allocated to another mobile station.

As described above, the access router 340 receives CQI according to frame cells transmitted from the mobile station 300 through the access point 320. The access router 340 arranges the frame cells in order of superior quality, performs a process regarding selection of a sub-channel of a frame cell to be allocated to the mobile station 300, and transfers information about the sub-channel to the access point 320. The access point 320 allocates the sub-channel of the frame cell to the mobile station 300.

Consequently, a time delay is created of the same length as that of the sum of a duration 342 in which the mobile station 300 transfers the CQI to the access point 320 and the access router 340 receives CQI, a duration 306 in which the access router 340 selects an assembly of sub-channels of frame cells on the basis of the received CQI about the frame cells and transfers the assembly to the access point 320, and a duration 308 in which the access point 320 allocates the received sub-channel of the frame cell to the mobile station 300. Accordingly, although the access router 340 allocates a sub-channel of a frame cell on the basis of initially-transferred CQI 302 to mobile station 300, the allocated sub-channel does not reflect a change of a channel condition according to the time delay. Therefore, the allocated sub-channel quality may not be optimized for the mobile station 300. Accordingly, a new dynamic channel allocating method is required that reflects a channel condition changing until the mobile station 300 is allocated a channel, after initially transferring CQI 302.

SUMMARY OF THE INVENTION

Accordingly, the present invention has been designed to solve the above and other problems occurring in the prior art. A first object of the present invention is to provide a system and a method for adaptively allocating a channel according to channel states in a wireless communication system using an orthogonal frequency division multiplexing scheme.

A second object of the present invention is to provide a system and a method for dynamically allocating a channel on a basis of newest channel quality information in a wireless communication system using an orthogonal frequency division multiplexing scheme.

A third object of the present invention is to provide a system and a method for providing an optimal channel condition by comparing newest CQI with information about a frame cell transmitted from an access router and by determining a channel in a wireless communication system using an orthogonal frequency division multiplexing scheme.

In order to accomplish the above and other objects, there is provided a method for dynamically allocating channels in a wireless communication system including multiple sub-channels and multiple frame cells, each of the sub-channels being an assembly including a preset number of sub-frequency bands divided from an overall frequency band, the frame cells using each of the sub-channels as a basic transmission unit and having a frequency domain and a time domain occupied by the sub-channels. The includes the steps of: transmitting, by a mobile station, channel quality information according to frame cells to an access router through an access point; transmitting, by the access point, the channel quality information according to frame cells to an access router; determining, by the access router, channel allocation information about the multiple frame cells and the multiple sub-channels based on the channel quality information; transmitting, by the access router, channel allocation information about the multiple frame cells and sub-channels determined according to the received channel quality information to the access point; and comparing, by the access point, the received channel allocation information about the frame cells with newest channel quality information received from the mobile station and allocating a sub-channel of a selected frame cell to the mobile station as a result of a comparison.

Additionally, there is provide a method for dynamically allocating channels by an access router in a wireless communication system including multiple sub-channels and multiple frame cells, each of the sub-channels being an assembly including a preset number of sub-frequency bands divided from an overall frequency band, the frame cells using each of the sub-channels as a basic transmission unit and having a frequency domain and a time domain occupied by the sub-channels. The method includes the steps of: receiving channel quality information according to frame cells received; determining channel allocation information about the multiple frame cells and the multiple sub-channels based on the received channel quality information; and transmitting channel allocation information about the multiple frame cells and the sub-channels determined according to the received channel quality information to the access point.

Further, there is provide a method for dynamically allocating channels by an access point in a wireless communication system including multiple sub-channels and multiple frame cells. Each of the sub-channels is an assembly including a preset number of sub-frequency bands divided from an overall frequency band. The frame cells use each of the sub-channels as a basic transmission unit and have a frequency domain and a time domain occupied by the sub-channels. The method includes the steps of: receiving channel quality information of frame cells transmitted from a mobile station; transmitting the channel quality information of frame cells to an access router; receiving channel allocation information about the multiple frame cells and the multiple sub-channels from the access router; comparing the channel allocation information about frame cells received from an access router with newest channel quality information received from the mobile station; and allocating a sub-channel of a frame cell selected based on the comparison to the mobile station.

Furthermore, there is provide a system for dynamically allocating channels in a wireless communication system including multiple sub-channels and multiple frame cells. Each of the sub-channels is an assembly including a preset number of sub-frequency bands divided from an overall frequency band. The frame cells use each of the sub-channels as a basic transmission unit and have a frequency domain and a time domain occupied by the sub-channels. The system includes: a mobile station for transmitting channel quality information of frame cells to an access point; an access router for transmitting channel allocation information about the multiple frame cells and sub-channels determined according to the received channel quality information to the access point; and the access point for receiving the channel allocation information about the multiple frame cells and sub-channels, comparing the channel allocation information with newest channel quality information, and allocating a sub-channel of a frame cell selected based on the comparison to the mobile station.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
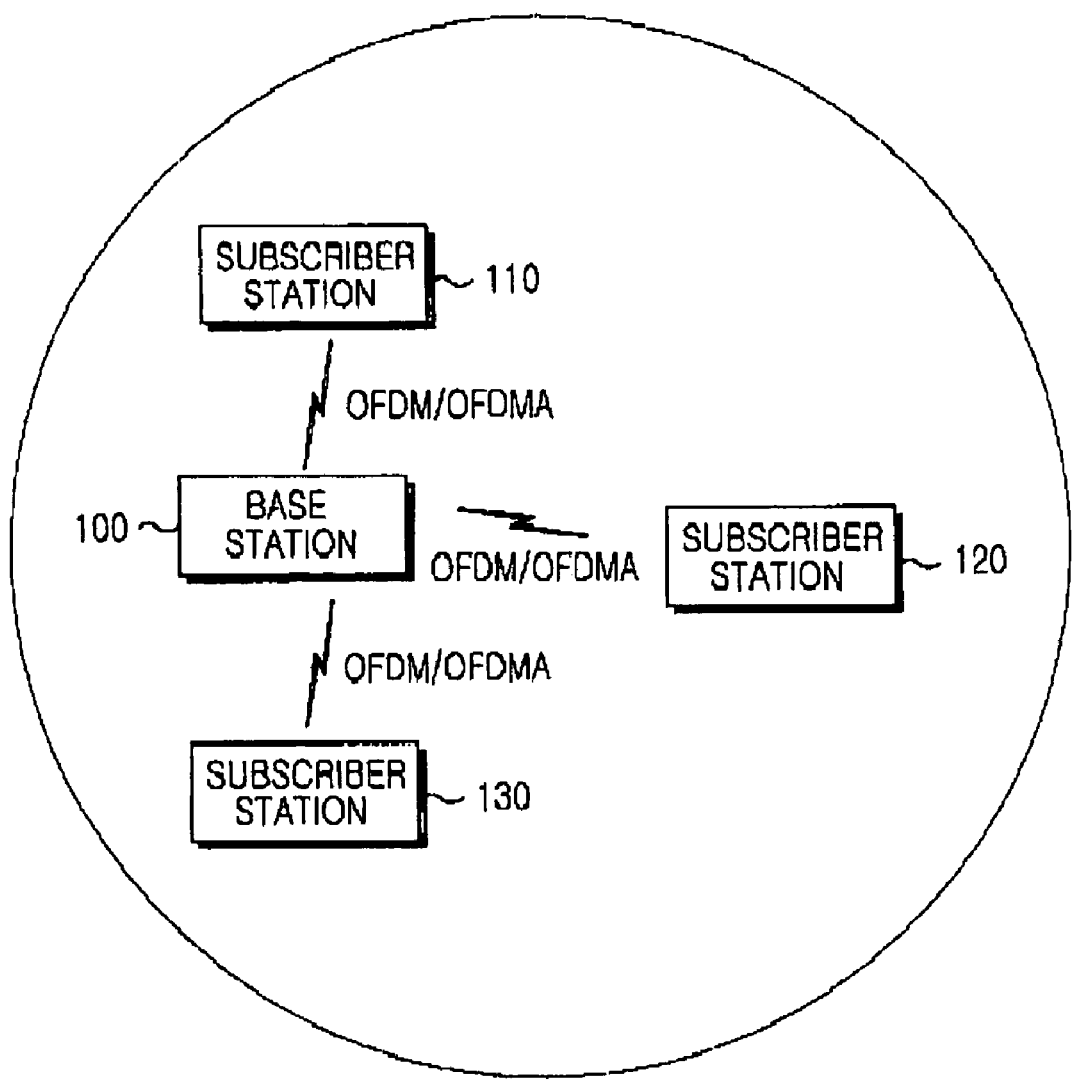
FIG. 1 is a block diagram schematically illustrating a conventional broadband wireless access communication system utilizing an OFDM scheme and an OFDMA scheme.
Figure 2:
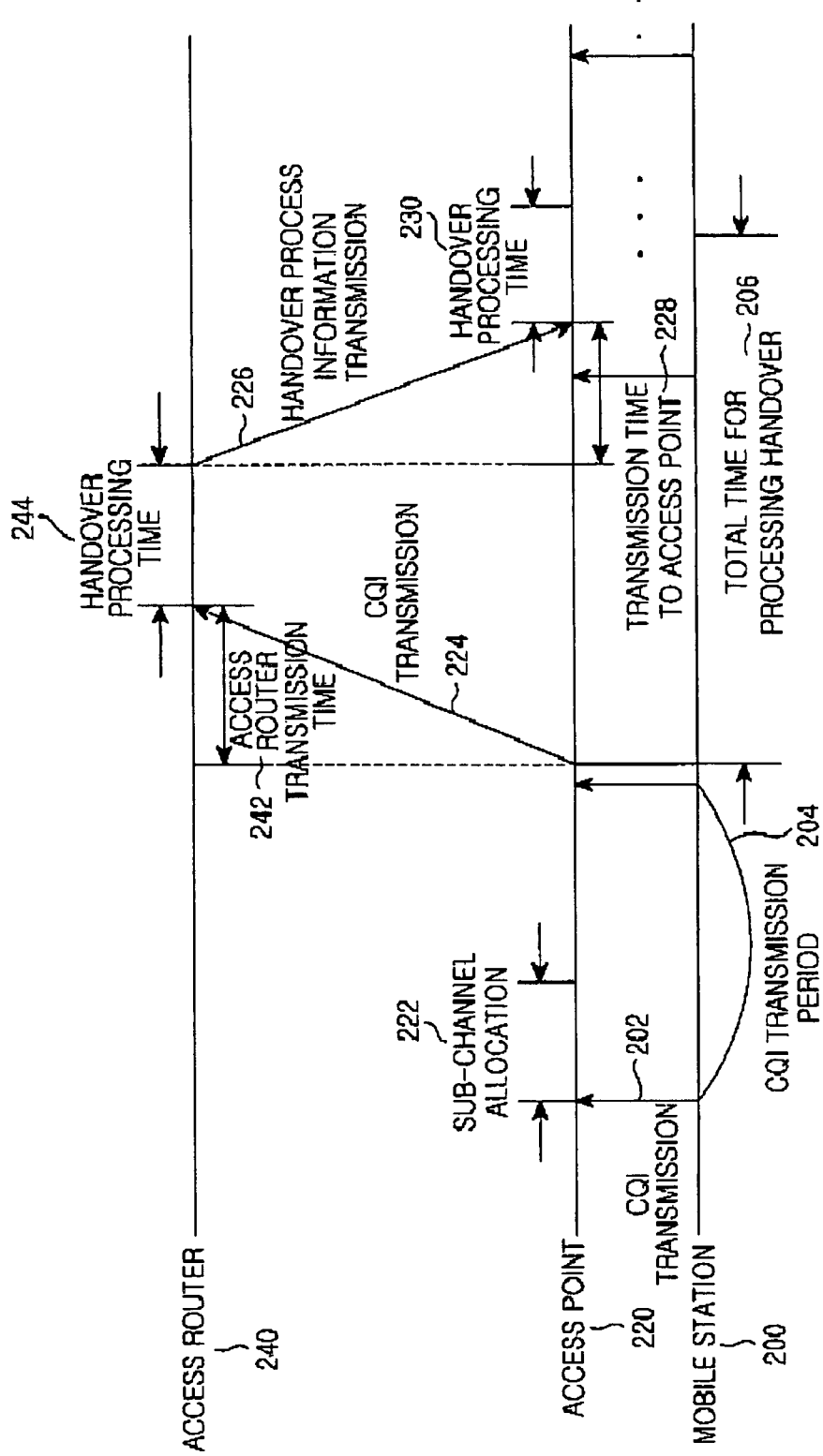
FIG. 2 illustrates a process of dynamically allocating channels depending on a decision of an access point in a conventional OFDM mobile telecommunication system according to passage of time.
Figure 3:
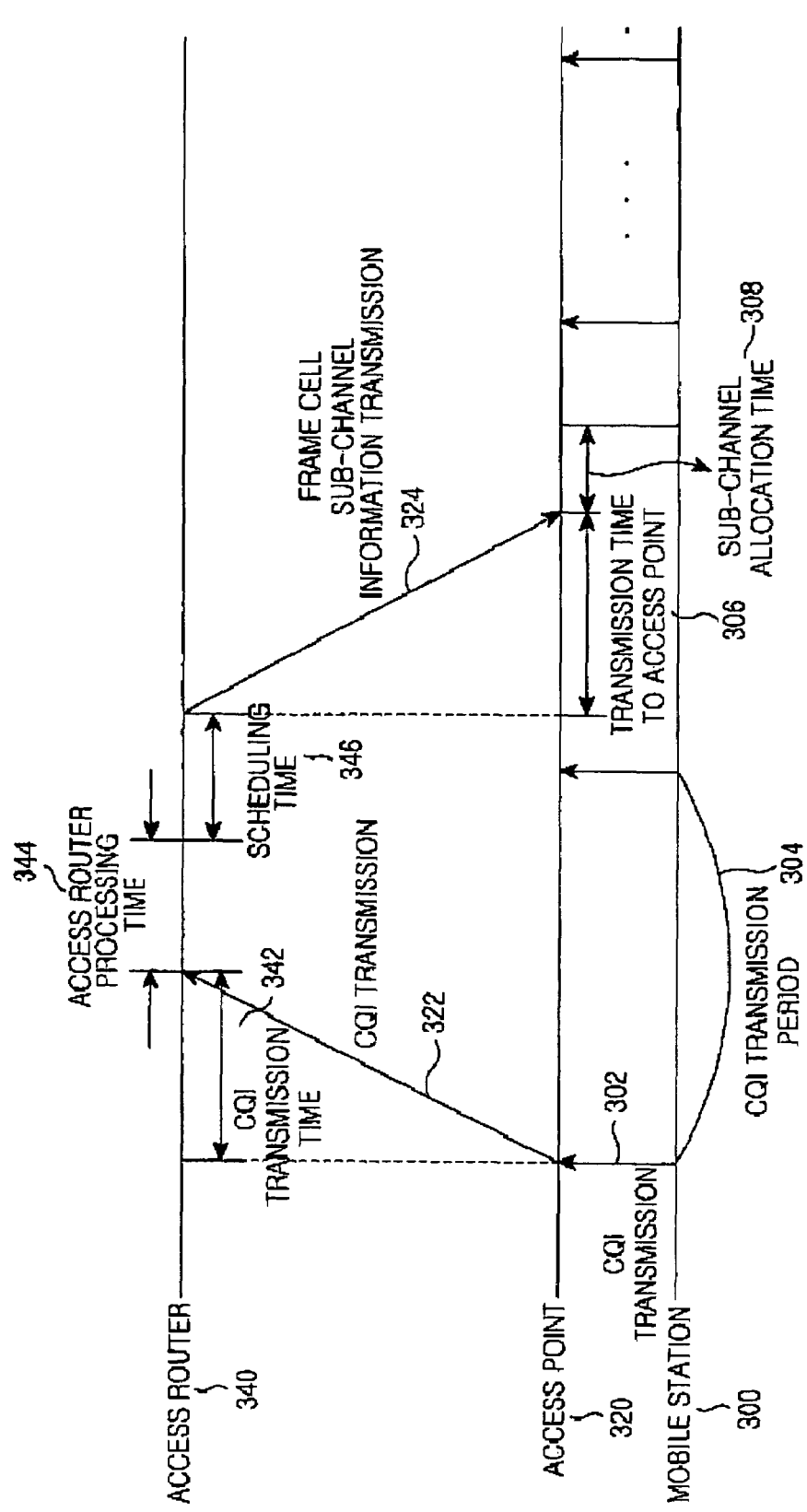
FIG. 3 illustrates a process of dynamically allocating channels depending on a decision of an access router in a conventional OFDM mobile telecommunication system according to passage of time.

Preferred embodiments of the present invention will be described in detail herein below with reference to the accompanying drawings. In the drawings, the same or similar components are designated by the same reference numerals as far as possible although they are shown in different drawings. Additionally, in the following description of the present invention, a detailed description of known functions and configurations incorporated herein will be omitted when it may obscure the subject matter of the present invention.

The present invention suggests a system and method for allocating an optimal dynamic channel to a mobile station in a wireless communication system using an Orthogonal Frequency Division Multiplexing (OFDM) scheme.

According to the present invention, a system includes a mobile station, a base station, and a base station controller. The base station includes an access point, and the base station controller includes an access router. Herein, the base station and the access point have the same meaning, and the base station controller and the access router have the same meaning.

The access point according to the present invention receives sub-channels of a plurality of frame cells with superior quality from the access router and compares the frame cells with newest Channel Quality Information (CQI) stored by the access point. Thereafter, the access point allocates a sub-channel of an optimal frame cell to the mobile station. The frame cell is a unit used when the mobile station transfers CQI to the access point. The frame cell is defined with reference to FIG. 4.

Figure 4:
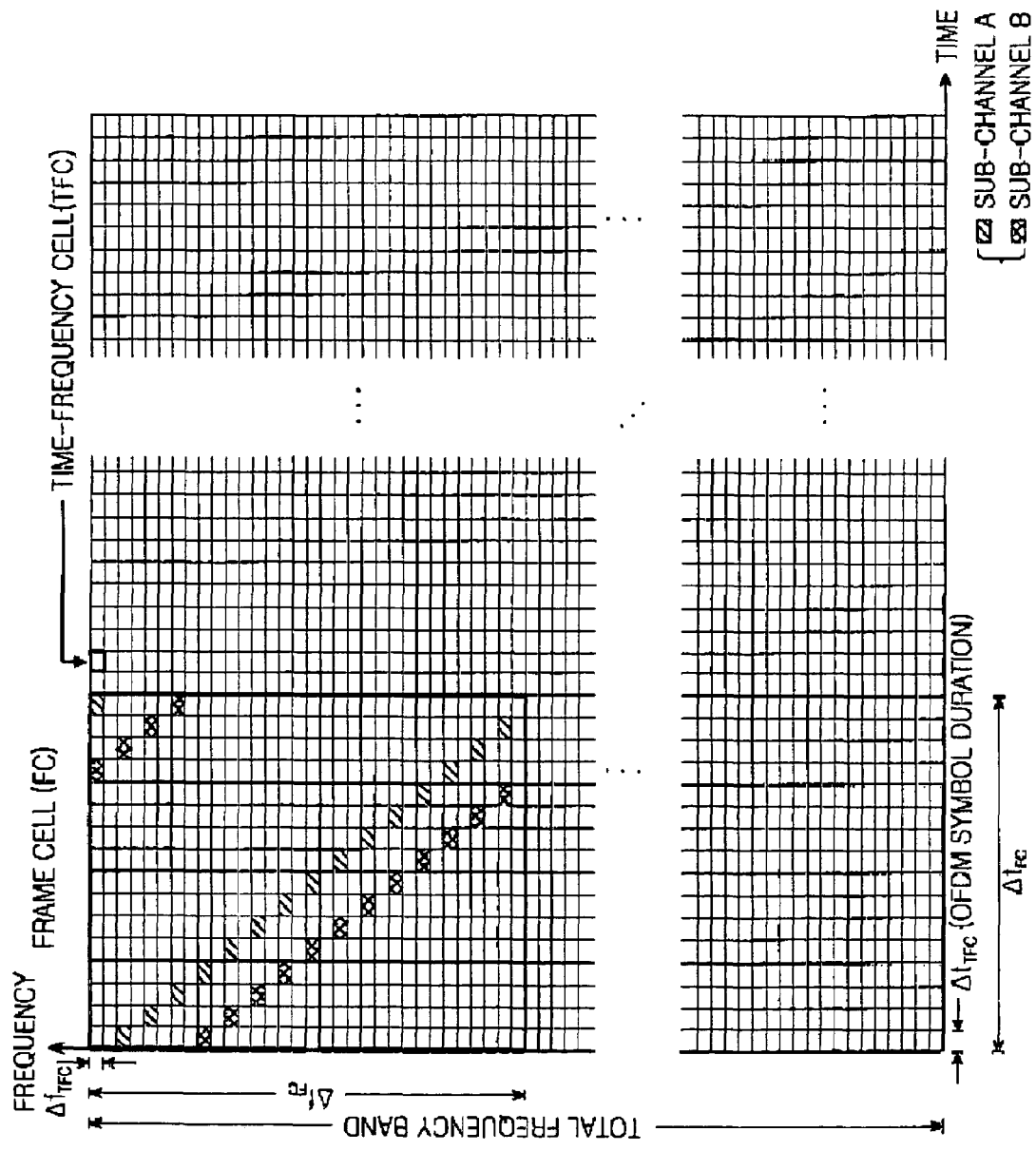
FIG. 4 is a graph schematically illustrating time-frequency resource allocation of an FH-OFCDMA communication system.

FIG. 4 is a graph schematically illustrating time-frequency resource allocation in a communication system using a Frequency Hopping-Orthogonal Frequency Code Division Multiple Access (FH-OFCDMA) scheme. Referring to FIG. 4, in the FH-OFCDMA scheme, time-frequency resources are efficiently allocated to a plurality of mobile stations. Time-frequency resources that are allocated to each mobile station are determined depending on a predetermined bandwidth and time. The bandwidth is allocated according to service types required by each mobile station. For example, a mobile station requesting services requiring a large amount of time-frequency resources, such as a high-speed packet data service, obtains a wider bandwidth. Conversely, a mobile station requesting services requiring a relatively small amount of time-frequency resources such as a voice service, etc., obtains a narrower bandwidth. Accordingly, the time-frequency resources are differentially allocated to each mobile station.

The FH-OFCDMA scheme maximizes a performance gain by combining characteristics of an OFDM scheme, a Code Division Multiple Access (CDMA) scheme, and an FH scheme. In the FH-OFCDMA scheme, a total bandwidth is divided into a plurality of sub-carrier domains, that is, sub-frequency domains. A Time-Frequency Cell (TFC) is defined as an area having a frequency domain (AfTFc) including a predetermined number of sub-frequency domains with a frame duration (AtTFc) identical to an OFDM symbol interval illustrated in FIG. 4. The TFC includes a predetermined number of sub-frequency domains. Herein, it is natural to variably set the number of sub-frequency domains included in the TFC depending on conditions in a system. Also, a frequency domain and a time domain occupied by the TFC are called a "TFC frequency domain" and a "TFC time interval", respectively. Accordingly, squares shown in FIG. 4 represent the TFCs.

A frame cell is defined as a time-frequency domain, which has a bandwidth (Af frame cell) corresponding to predetermined multiple times of the TFC (for example, 32 times of the TFC) and a frame duration corresponding to predetermined multiple times of the TFC (for example, 16 times of the TFC). Sub-channels A and B, which are two mutually different sub-channels in one frame cell, are illustrated in FIG. 4. Herein, the sub-channel refers to a preset number of TFCs, which are transferred while performing frequency-hopping according to a preset frequency hopping pattern according to passage of time. Herein, the number of TFCs included in the sub-channel and a frequency hopping pattern for the sub-channel are variably set according to conditions of a system. For the purpose of description, it is assumed that one sub-channel has 16 TFCs. The two different sub-channels can be allocated to different mobile stations or one mobile station.

The sub-channels perform frequency-hopping by a predetermined frequency interval according to the passage of time. Accordingly, a sub-channel allocated to each terminal is dynamically changed according to a fading characteristic varied according to the passage of time.

Figure 5:
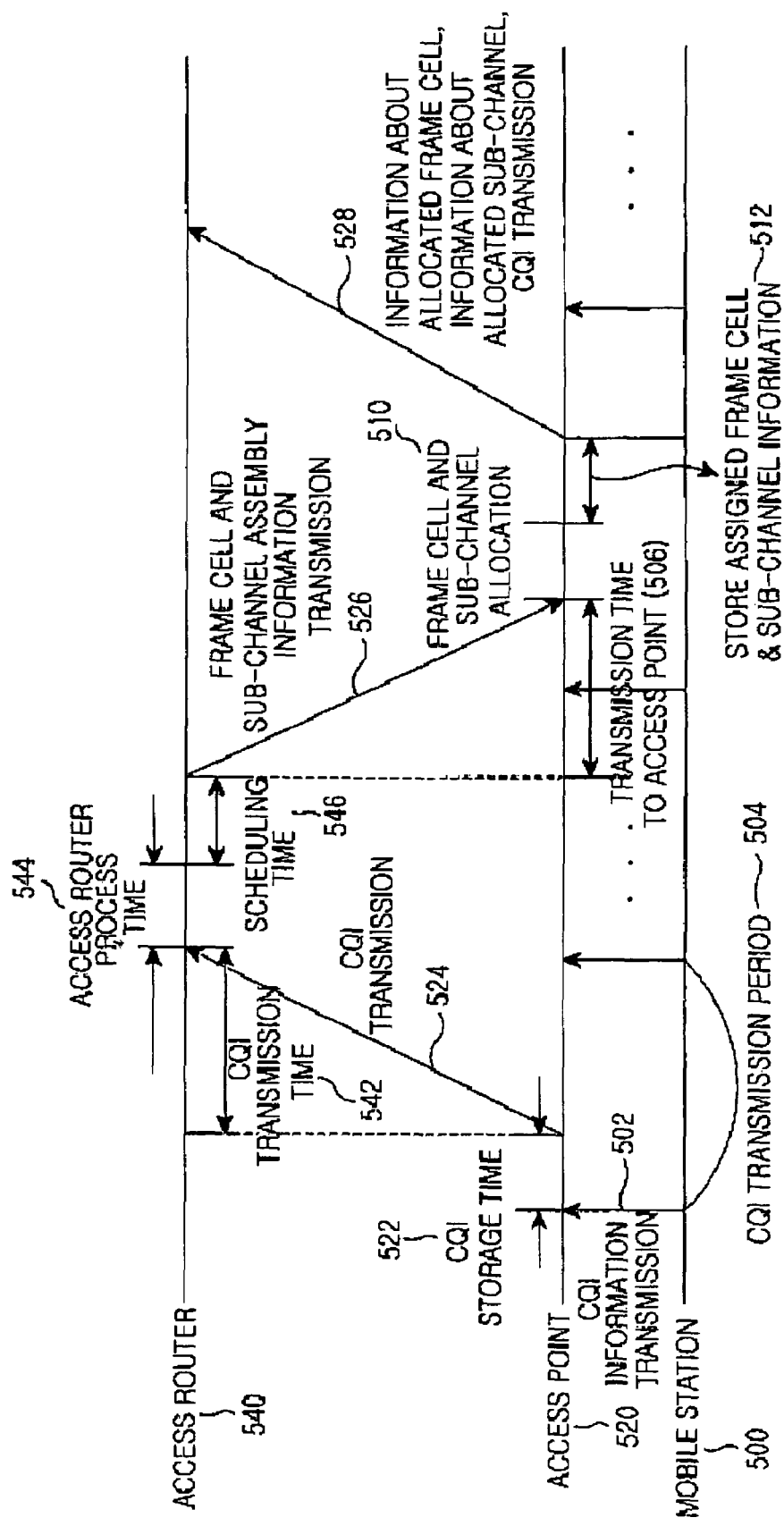
FIG. 5 illustrates a process of dynamically allocating channels in an FH-OFCDMA communication system according to an embodiment of the present invention according to passage of time.

FIG. 5 illustrates a time relation when dynamic channel allocation is performed in a FH-OFCDMA communication system according to an embodiment of the present invention.

Referring to FIG. 5, a mobile station 500 repeatedly transfers CQI according to frame cells to an access point 520 thereof at a predetermined time interval, that is, a CQI transmission period in step 502. For example, the CQI may include a signal-to-noise ratio (SNR). The access point 520 stores CQI of each frame cell during CQI storing time 522. Thereafter, the access point 520 analyzes the received CQI. When the access point 520 determines to change a channel condition due to an inferior channel condition of the mobile station 500, the access point 520 transfers the CQI to the access router 540 in step 524. The mobile station 500 can determine for itself whether or not to change a channel condition and can transfer a request for the change of a channel to the access point 520.

The access point 520 transfers the CQI to the access router 540 in both cases regarding the change of a channel condition in step 524. The access router 540 arranges frame cells in order of superior CQI on the basis of received CQI according to the frame cells during an access router process time 544. According to the present invention, the frame cells are classified as "Good", "Normal", and "Bad" frame cells and are arranged accordingly. Because CQI is transmitted from the mobile station 500 by the frame cell unit, signaling load can occur in the access point 520. Therefore, the access point 520 uses an AMC scheme for frame cells, thereby being capable of reducing the signaling load.

The access router 540 selects the optimal frame cell to be allotted to the mobile station 500 from among frame cells arranged in order of superior CQI and an assembly of sub-channels corresponding to the optimal frame cell during an access router scheduling time 546 and transfers the selected allocation information to the access point in step 526.

Preferably, the access router 540 arranges the frame cells in descending order from a frame with superior quality. That is, in a classification method according to the present invention, the frame cells are arranged in order from the "Good" frame cell to a "Bad" frame cell. Also, the access router 540 transfers information about frame cells allocable to the mobile station from among frame cells with superior quality and information about sub-channels to the access point 520. The access point 520 compares information about received frame cells with frame cells having superior quality selected through newest CQI stored by the access point 520 and selects the optimal frame cell. As a result, the access point 520 allocates a sub-channel of the selected optimal frame cell to the mobile station 500 in step 510.

More specifically, the mobile station 500 transfers CQI, for example, ten frame cells to the access point 520, and the access router 540 receives the transmission information from the access point 520. The access router 540 numbers the received ten frame cells and selects two frame cells of ten frame cells in order of superior quality. Herein, the access router 540 selects two frame cells by way of example. Therefore, it is noted that an actually embodied system can select the suitable number of frame cells according to a system condition.

For example, it is assumed that the selected two frames are a third frame cell and a seventh frame cell, and each frame cell has three sub-channels of "A", "B", and "C". Additionally, it is assumed that empty sub-channels of the third and seventh frame cells are [B], and [A, B], respectively. It is noted that the number of the sub-channels is a variable that can be changed when a system is designed.

The access router 540 transfers information about the selected two frame cells and information about empty sub-channels from among sub-channels corresponding to the two frame cells to the access point 520. The access point 520 compares received information about the two frame cells with newest CQI stored in the access point 520 and selects the optimal frame cell to be allocated to the mobile station. The newest CQI has information about ten frame cells. Assuming that quality priority order of the frame cells corresponding to the newest CQI is order of "2, 3, 4, 9, 1, 5, 4, 8, 6, 7, 10", the access point 520 compares the newest CQI with the third and seventh frame cells received from the access router 540.

As a result of the comparison, the access point 520 selects the third frame cell and searches for empty sub-channels of the selected third frame cell. If the access point 520 determines that 'B' sub-channel among the sub-channels is empty, the access point 520 allocates the B sub-channel of the third frame cell to the mobile station 500. Thereafter, the access point 520 transmits information about the allocated frame cell and sub-channel to the access router 540 in step 528. If the access point 520 or the mobile station 500 determines that a channel condition is inferior, the access point 520 can transmit CQI with information about the allocated frame cell and sub-channel to the access router 540. The access router 540 receives the information updates information about an assembly of sub-channels of frame cells stored in the access router 540 and takes into consideration of the information when next selecting a sub-channel of a frame cell to be allocated to the mobile station 500. That is, if all sub-channels of an allocated frame cell are occupied, the frame cell with all occupied sub-channels is excluded when the access router 540 arranges and selects frame cells after a predetermined time elapses.

Figure 6:
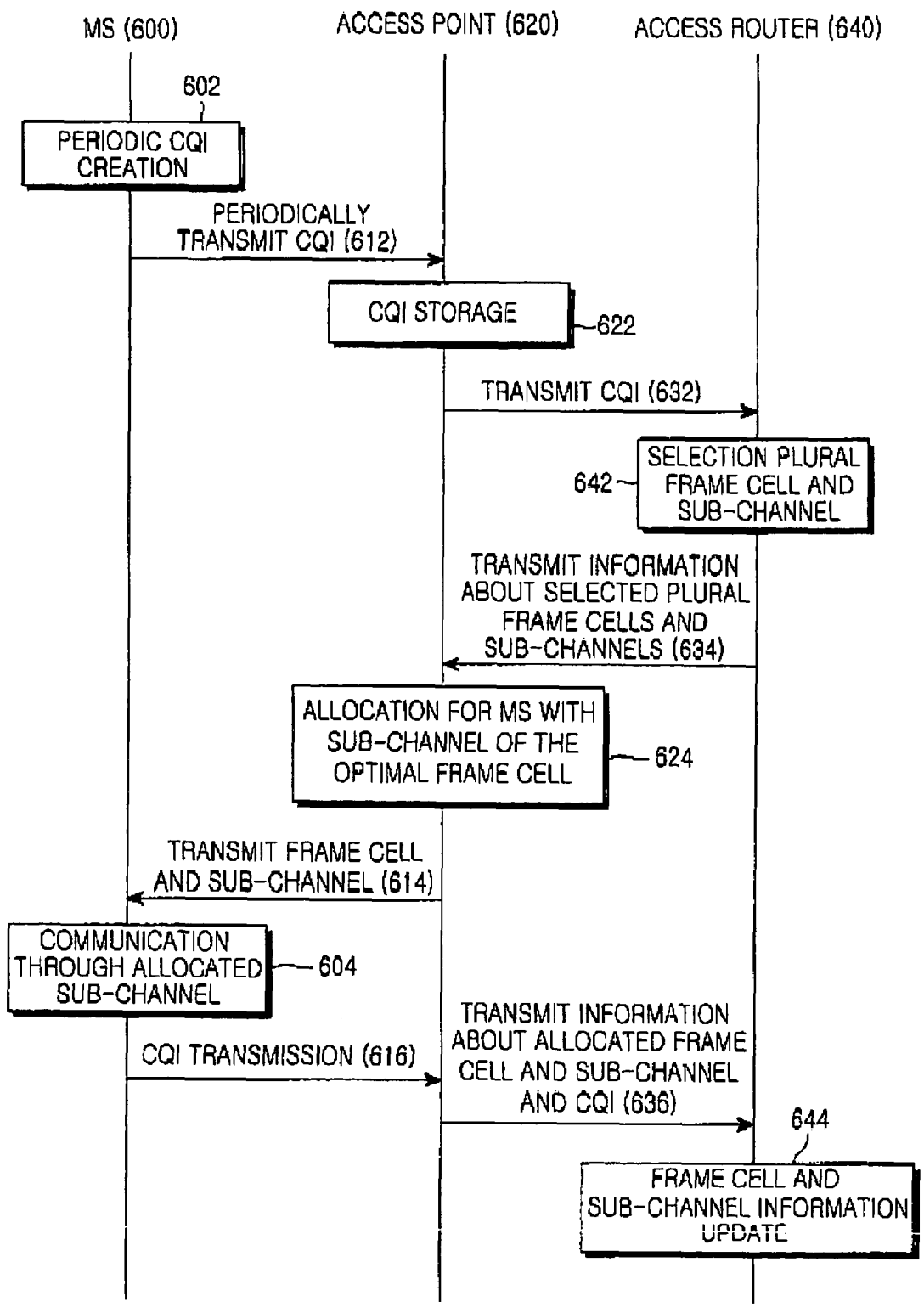
FIG. 6 is a flowchart illustrating a dynamic channel allocation process in an OFDM mobile telecommunication system according to an embodiment of the present invention.

FIG. 6 is a diagram illustrating a dynamic channel allocation process in an OFDM mobile telecommunication system according to an embodiment of the present invention. Referring to FIG. 6, an access point 620 transmits a pilot signal through pilot sub-carriers with a preset position. That is, a mobile station 600 previously knows the position of the pilot sub-carriers transmitted from the access point 620 and the pilot signal transmitted through the pilot sub-carriers. Herein, the pilot signal has a preset sequence. That is, a sequence included in the pilot signal, i.e., a pilot sequence, is promised between a base station and a subscriber terminal.

Accordingly, the mobile station 600 receives the pilot signal in order to synchronize with the access point 620, and creates CQI in step 602. The CQI is transferred to the access point 620 by a predetermined number of frame cells after a transmission period lapse in step 612.

After storing the CQI transferred from the mobile station 600 in step 622, the access point 620 transfers the CQI to the access router 640 in step 632. The access router 640 analyzes the CQI and arranges frame cells in order of superior quality. According to the present invention, the access router 640 classifies the frame cells into "Good", "Normal", or "Bad" frame cells and arranges the frame cells in order from "Good" to "Bad". Also, according to the present invention, it is assumed that a plurality of sub-channels of the frame cells have the same quality.

The access router 640 assigns priority sequence numbers to the arranged frame cells and selects portions of frame cells with superior quality and sub-channels corresponding the frame cells in step 642. The selected information is transferred to the access point 620 in step 634. The access point 620 compares newest CQI stored in the access point 620 with the information about the received frame cells and sub-channels, and selects the optimal frame cell and sub-channel to be allocated to the mobile station.

The access point 620 allocates the sub-channel of the selected frame cell to the mobile station 600 in step 614, and the mobile station 600 communicates with the access router 640 through the sub-channel of the allocated frame cell in step 604. The CQI is newly created after a transmission period lapses and transferred to the access point 620 by a predetermined number of frame cells in step 616.

After allocating a sub-channel of a frame cell to the mobile station 600, the access pointer 620 transfers information about the sub-channel of the frame cell allocated to the mobile station 600 to the access router 640 in step 636. Herein, the access point 620 can transfer newest stored CQI to the access router 640 when the access point 620 changes a channel of the mobile station or the mobile station changes a channel according to a determination thereof. The access router 640 receives the information updates information about an assembly of sub-channels of frame cells stored in the access router 640 in step 644.

Figure 7:
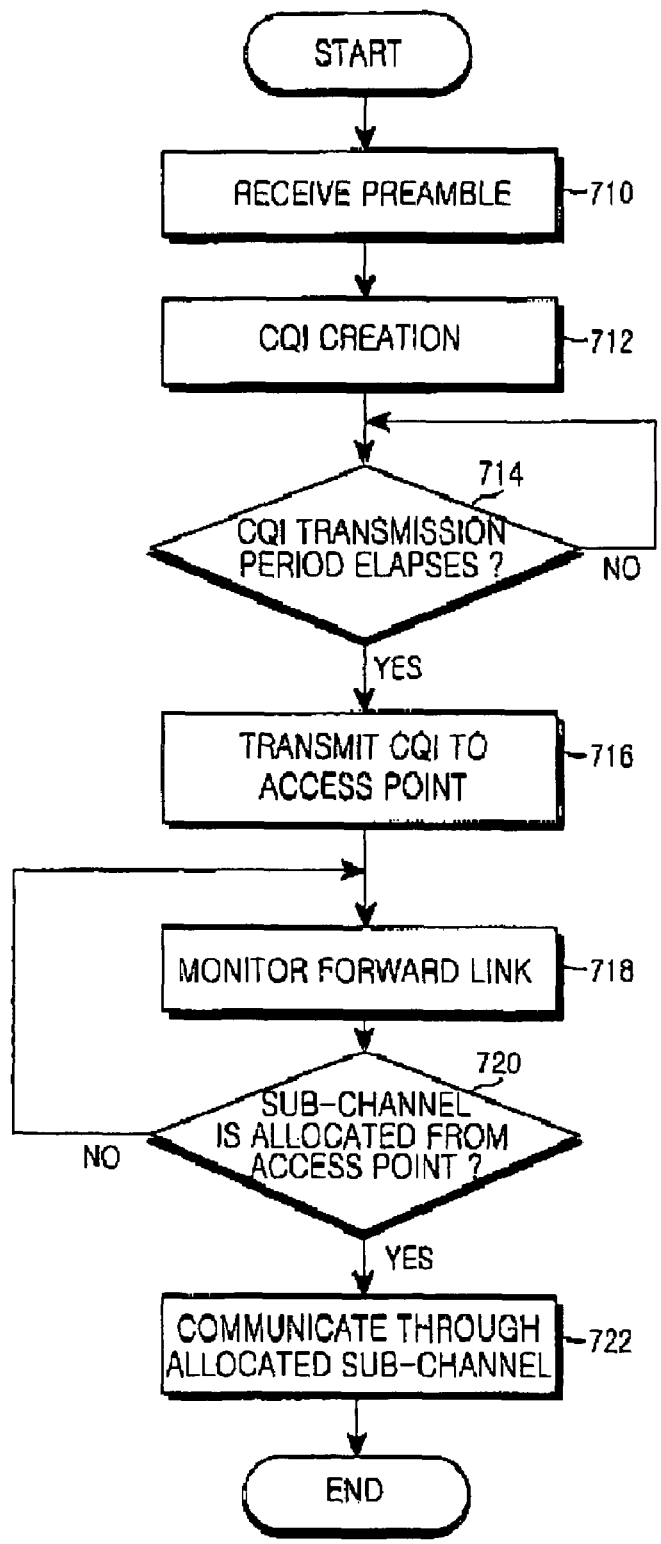
FIG. 7 is a flowchart illustrating an operation of a mobile station according to an embodiment of the present invention.

FIG. 7 is a flowchart illustrating an operation of the mobile station 600 illustrated in FIG. 6 according to an embodiment of the present invention. Referring to FIG. 7, the mobile station receives a pilot signal transmitted from an access point and synchronizes with the access point in step 710. The mobile station creates CQI in step 712. The mobile station determines if a CQI transmission period elapses in step 714. If the CQI transmission period has elapsed, the mobile station performs step 716. However, if the CQI transmission period has not elapsed, the mobile station does not transfer CQI until a next transmission period. The mobile station transfers CQI to the access point in step 716.

Herein, the CQI transmitted from the mobile station is used as a basis on which the mobile station determines that a channel condition thereof is inferior and requests for a change of the channel condition, or when the access point analyzes the CQI transmitted from the mobile station and changes the channel condition.

When one of the above two cases is satisfied, the mobile station, which intends to change a channel condition, performs step 720 while continuously monitoring a forward link for the base station in step 718. When the mobile station receives information about allocation for a sub-channel of a frame cell from the access point in step 720, the mobile station communicates with the access point through the sub-channel of the frame cell in step 722.

Figure 8:
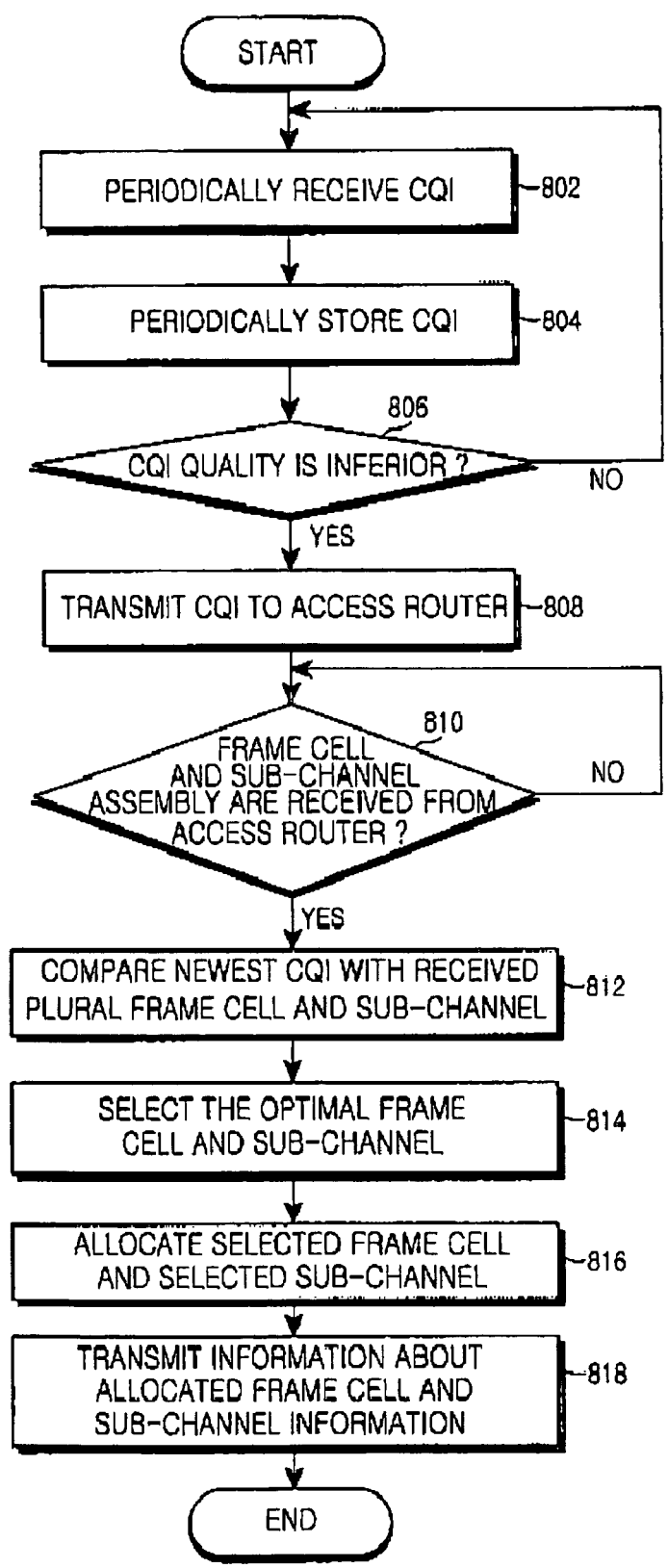
FIG. 8 is a flowchart illustrating an operation of an access point according to an embodiment of the present invention.

FIG. 8 is a flowchart illustrating an operation of the access point illustrated in FIG. 6 according to an embodiment of the present invention. Referring to FIG. 8, the access point synchronizes with the mobile station that receives a pilot signal and then receives CQI from the mobile station in step 802. In step 804, the access point stores periodically received CQI. If the access point determines that the channel quality of the received CQI is inferior or receives from the mobile station a request message with CQI for changing the channel in step 806, the access point transfers the CQI received from the mobile station to the access router in step 808. However, if the access point determines that the channel quality of the received CQI is not inferior, the operation returns to step 802.

If the access point has received information about frame cells and sub-channels assembly from the access router in step 810, the access point performs step 812. However, if the access point has not received the information about frame cells and sub-channels assembly, the access point should wait until the access router have transmitted the information about frame cells and sub-channels assembly. Herein, the information about the frame cells and sub-channels received by the access point is a portion of superior frame cell and sub-channel information determined by the access router. The access point compares a plurality of frame cells and corresponding sub-channels received from the access router with newest CQI received from the mobile station in step 812. The access point selects the optimal frame cell and the optimal sub-channel as a result of the comparison in step 814. The access point allocates the selected sub-channel to the mobile station in step 816. Thereafter, the access point transmits information about the frame cell and sub-channel allocated to the mobile station to the access router in step 818.

Figure 9:
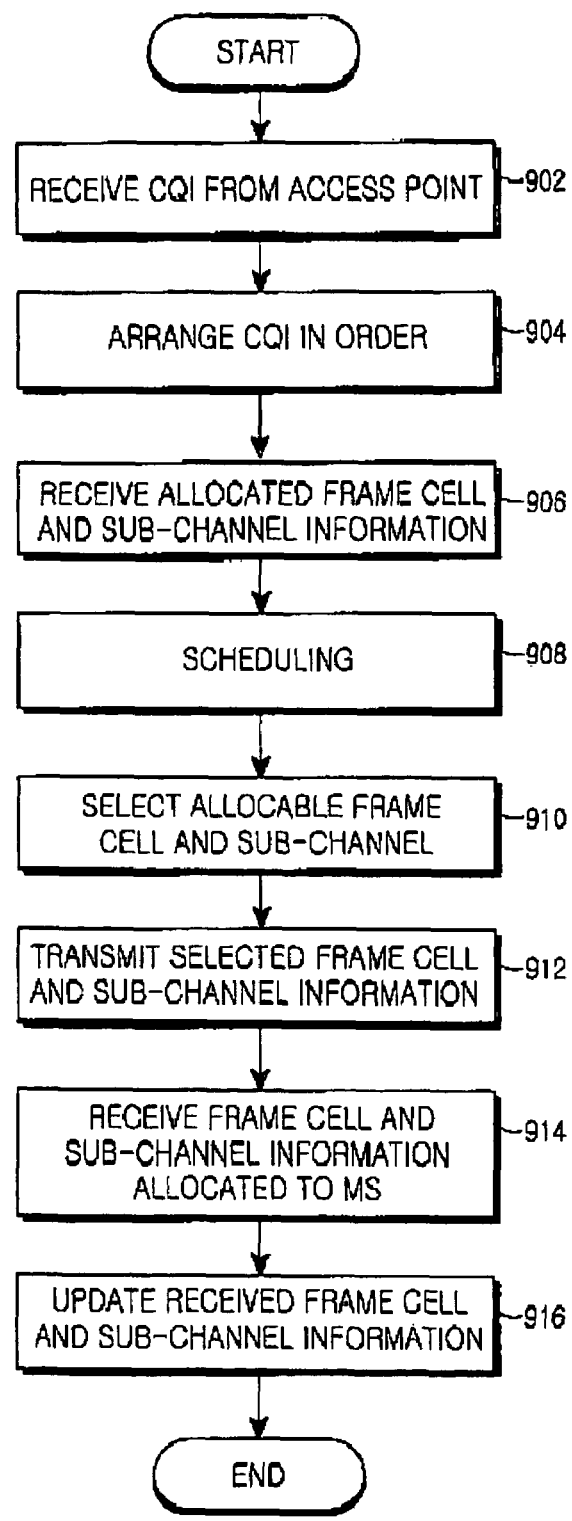
FIG. 9 is a flowchart illustrating an operation of an access router according to an embodiment of the present invention.

FIG. 9 is a flowchart illustrating an operation of the access router illustrated in FIG. 6. Referring to FIG. 9, the access router receives CQI of the mobile station from the access point in step 902. The access router arranges frame cells in order from a frame cell with superior quality to a frame cell with inferior quality on the basis of received CQI in step 904. The access router receives information about the frame cell and sub-channel allocated to the mobile station in step 906. Thereafter, the access router performs scheduling based on the received information about the frame cell and sub-channel in step 908.

The access router selects information about a plurality of frame cells and information about sub-channels to be transferred to the access point from updated information about frame cells and sub-channels in step 910. The access router transmits information about the selected frame cells and information about corresponding sub-channels to the access point in step 912.

The access point receives information about the frame cells and information about corresponding sub-channels compares the information with newest CQI, selects the optimal frame cell, and allocates a sub-channel of the selected optimal frame cell to the mobile station. The access point, which has allocated the sub-channel to the mobile station, transfers allocation information to the access router. Accordingly, the access router receives information about the frame cell and the sub-channel allocated to the mobile station from the access point in step 914. The access router updates stored information about frame cells and sub-channels in step 916.

According to the present invention, an access point compares information about a plurality of frame cells transmitted from an access router with newest channel quality information of a mobile station and allocates the optimal sub-channel to the mobile station in a mobile telecommunication system using an orthogonal frequency division multiplexing scheme. Additionally, handover processing efficiency is increased by reflecting a newest channel condition when the mobile station performs handover.

While the present invention has been shown and described with reference to certain preferred embodiments thereof, it will be understood by those skilled in the art that various changes in form and details may be made therein without departing from the spirit and scope of the present invention. Accordingly, the scope of the present invention should not be limited to the described embodiments, but should be defined by the appended claims and equivalents thereof.

What is claimed is:

1. A method of dynamically allocating channels in a wireless communication system including multiple sub-channels and multiple frame cells, each of the sub-channels being an assembly including a preset number of sub-frequency bands divided from an overall frequency band, the frame cells using each of the sub-channels as a basic transmission unit and having a frequency domain and a time domain occupied by the sub-channels, the method comprising the steps of:

transmitting, by a mobile station, channel quality information according to frame cells to an access point;

transmitting, by the access point, the channel quality information according to frame cells to an access router;

determining, by the access router, channel allocation information about the multiple frame cells and the multiple sub-channels based on the channel quality information;

transmitting, by the access router, the channel allocation information about the multiple frame cells and the multiple sub-channels to the access point;

comparing, by the access point, the received channel allocation information about the multiple frame cells with newest channel quality information received from the mobile station; and allocating, by the access point, a sub-channel of a selected frame cell to the mobile station as a result of the comparisons, wherein the step of determining the channel allocation information about the multiple frame cells and the multiple sub-channels comprises the steps of:

sequentially arranging the multiple frame cells according to the channel quality information received from the mobile station; and determining a predetermined number of frame cells from among the arranged frame cells in an order based on superior channel quality.

2. The method as claimed in claim 1, further comprising a step of selecting, by the access point, a sub-channel to be allocated to the mobile station.

3. The method as claimed in 2, wherein the step of selecting the sub-channel to be allocated to the mobile station comprises:

comparing channel quality information with the channel allocation information about multiple frame cells, the channel quality information being received from the mobile station and corresponding to a current time, the channel allocation information about multiple frame cells being received from the access router and corresponding to a previous time; and selecting a sub-channel of an optimal frame cell that is selected based on the comparison.

4. A method of dynamically allocating channels by an access router in a wireless communication system including multiple sub-channels and multiple frame cells, each of the sub-channels being an assembly including a preset number of sub-frequency bands divided from an overall frequency band, the frame cells using each of the sub-channels as a basic transmission unit and having a frequency domain and a time domain occupied by the sub-channels, the method comprising the steps of:

receiving channel quality information according to frame cells from an access point;

determining channel allocation information about the multiple frame cells and the multiple sub-channels based on the received channel quality information; and transmitting the channel allocation information about the multiple frame cells and the multiple sub-channels to the access point, wherein the sten of determining the channel allocation information about the multiple frame cells and the multiple sub-channels comprises the steos of:

sequentially arranging the multiple frame cells according to the channel quality information; and determining a predetermined number of frame cells from among the arranged frame cells in an order based on superior channel quality.

5. A method for dynamically allocating channels by an access point in a wireless communication system including multiple sub-channels and multiple frame cells, each of the sub-channels being an assembly including a preset number of sub-frequency bands divided from an overall frequency band, the frame cells using each of the sub-channels as a basic transmission unit and having a frequency domain and a time domain occupied by the sub-channels, the method comprising the steps of:

receiving channel quality information of frame cells transmitted from a mobile station;

transmitting the channel quality information of frame cells to an access router;

receiving channel allocation information about the multiple frame cells and the multiple sub-channels from the access router;

comparing channel quality information with the channel allocation information about the multiple frame cells, the channel quality information being received from the mobile station and corresponding to a current time, the channel allocation information about the multinle cells being received from the access router and corresponding to a previous time; and selecting a sub-channel of an optimal frame cell selected based on the comparison; and allocating to the mobile station a sub-channel of a frame cell selected according to the comparison.

6. A system for dynamically allocating channels in a wireless communication system including multiple sub-channels and multiple frame cells, each of the sub-channels being an assembly including a preset number of sub-frequency bands divided from an overall frequency band, the frame cells using each of the sub-channels as a basic transmission unit and having a frequency domain and a time domain occupied by the sub-channels, the system comprising:

a mobile station for transmitting channel quality information of the multiple frame cells;

an access router for arranging the multiple frame cells according to the channel quality information received from the mobile station, determining a predetermined number of frame cells from among the arranged frame cells in an order based on superior channel quality, transmitting information about the predetermined number of frame cells and at least one sub-channel to the access point; and an access point for receiving the channel allocation information about the multiple frame cells and the multiple sub-channels, comparing the cannel allocation information with newest channel quality information, and allocating to the mobile station a sub-channel of a frame cell selected according to the comparison.

7. The system claimed in claim 6, wherein the access point compares channel quality information with the channel allocation information about multiple frame cells and selects a sub-channel of an optimal frame cell selected based on the comparison, the access point selecting a sub-channel to be allocated to the mobile station, the channel quality information being received from the mobile station and corresponding to a current time, the channel allocation information about the multiple cells being received from the access router and corresponding to a previous lime.

* * * * *